UNITED STATES PATENT OFFICE 1,985,315

ART OF TREATING FERROUS METALS

Chambers R. Culling and Malvin A. Baernstein, St. Louis, Mo., assignors to National Pigments and Chemical Company, St. Louis, Mo., a corporation of Missouri No Drawing. Application June 24, 1933, Serial No. 677,390

9 Claims. (Cl. 75—46)

This invention relates generally to the treatment of ferrous metals, and particularly to a process of controlling the charge of a high temperature furnace having a non-basic lining, such as an electric furnace, and improving the characteristics of the castings.

In the operation of high temperature melting equipment having a non-basic or high silica content lining, such as is the case with electric furnaces, it has heretofore been observed that the charge tends to absorb silicon from the lining which is present in the resultant castings as an impurity, either in the form of silicon or silicon dioxide. There is also a consequent deterioration of the furnace lining due to the absorption from it of silica. In an electric furnace after the charge has melted and become fluid, slag accumulates on the surface of the charge and is generally removed at a temperature of about 2700° F. Up to this time the charge will have remained quiet so that it may be kept under control. As the temperature of 2800° F. is approached, however, the charge generally displays a vigorous action in the nature of boiling and at this time a reducing atmosphere generally occurs in the furnace chamber. At this time there appears to be a break down of the furnace lining with the result that the silica released is absorbed by the charge and, due to the existence of a reducing atmosphere, some of the silica may be reduced to nascent silicon. During this period, as stated above, the charge is somewhat turbulent perhaps due to an increasing evolution of gases with the appearance that the charge is boiling.

The object of the present invention, generally stated, is to provide a process of treating ferrous metals in non-basic chambers whereby the turbulence of the charge at elevated temperatures is eliminated.

A further object of this invention is to provide a process of treating ferrous metals at elevated temperatures whereby the charge may be purged of inclusions, such as oxides and gases while the charge remains in the heating chamber.

Another object of this invention is to provide a process of treating ferrous metals so as to render the molten metal less susceptible to the absorption of gases from the molds and other outside sources.

Another object of the invention is to provide a process of treating ferrous metals at high temperatures, and particularly an agent for treating the molten charge whereby to improve the physical characteristics of the metal.

A more specific object of this invention is to provide a process for the treatment of ferrous metals at high temperatures employing as a treating agent an oxybarium compound.

Other objects will become apparent to those skilled in the art when the following description is read.

In accordance with the present invention, generally stated, and described for the purpose of illustration with reference to the conventional electric furnace practice, a small quantity of an oxybarium compound may be added to the furnace charge with the result that absorption of silicon from the lining and the consequent deterioration of the furnace lining is eliminated. Moreover, the oxybarium compound appears to have the effect of purging the metal of the inclusions such as oxides, sulphur and gases. An additional result of the use of such an oxybarium compound in the high temperature treatment of ferrous metals is the improved character of the resultant castings and the fact that the metal is not so susceptible to the absorption of gases from the molds. In accordance with the present invention, the oxybarium compound, which may be descriptively termed a flux, may be added to the charge of an electric furnace after the charge has been melted and preferably after the slag has been removed. This generally occurs at or about 2700° F. After the addition of a small quantity of the oxybarium flux, the temperature of the charge may be further elevated without encountering the boiling or turbulent condition which has heretofore characterized electric furnace charges at temperatures in excess of about 2800° F.

As a specific illustration of the procedure to be followed in accordance with the present invention it may be assumed that the charge of an electric furnace has been reduced to molten condition and is at the temperature of about 2700° F. At this time in accordance with the usual practice the slag may be removed from the charge. After the slag is removed a small quantity (for instance, ten pounds per ton of charge) of barium carbonate may be added to the charge. The temperature of the furnace may then be further elevated without demonstrating a boiling condition. Moreover, upon anaylsis of the castings it is evident that no silicon has been absorbed from the furnace lining and in fact a characteristic glaze on the lining appears to have been produced by the production of barium silicate in the furnace. It is to be understood that the barium having a great affinity for silica tends to unite with it at the surface of the lining rather than permit the silica to be absorbed by the molten charge where it would exist as an impurity.

The barium carbonate employed may be in any form, such for instance, as a powder or in a bricketted form. Moreover, the barium carbonate may be in the form of witherite ore, or it may be manufactured barium carbonate in a highly purified condition. Moreover, a combination of barium carbonate with barium oxide produces, to some extent at least, the beneficial effects of the barium carbonate alone. The barium carbonate may, for instance, be mixed with zero to fifty percent of commercial barium oxide. By commercial barium oxide is meant a barium oxide which may be contaminated with barium sulphate, alumina, and/or silicon dioxide.

Although for the purpose of illustration it has been stated that the amount of the oxybarium flux employed may be ten pounds per ton of charge, it may be pointed out that this amount is generally required only in the initial treatment in a particular furnace. It appears that after a few charges have been treated in accordance with the present invention in a particular furnace, the lining becomes more or less permanently glazed with what is believed to be barium silicate and thereafter there is less tendency for the charge to absorb silica from the lining. Consequently the beneficial results of the present invention may be obtained by the use of a smaller amount of oxybarium flux. Accordingly after the charges of a particular furnace have for a time been subjected to the treatments of the present invention, it is possible to reduce the amount of oxybarium flux to about two and a half pounds.

Castings poured from a metal treated in accordance with the procedure above described show a decided improvement in grain structure, strength, cleanliness and freedom from porosity. It is particularly noticeable that metal treated in accordance with the present invention demonstrates little, or no, tendency to absorb gases from the molds.

It will be understood that the present invention is adaptable for the treatment of white or gray cast iron as well as low carbon steel operating in each instance to quiet the charge at elevated temperatures in non-basic chambers having linings of high silica content and to deter adsorption of gases from the molds. Moreover, in the case of white cast iron, or so-called high test iron, the oxybarium flux demonstrates the ability of breaking up large pools of cementite and distributes the same throughout the casting.

From the foregoing description it is apparent that the process of the present invention is susceptible of many modifications and variations. It is to be understood, therefore, that the embodiment hereinbefore described is merely illustrative of the invention and that such modifications and the use of such individual features and subcombinations of features as may occur to those skilled in the art without departing from the spirit of this invention are, although not specifically described herein, contemplated by and within the scope of the appended claims.

Having thus described the invention, what is claimed is:

1. In the art of treating ferrous metals, the process comprising, melting the metal in an acidic chamber, removing slag from the molten charge, and adding to the molten charge in the acidic chamber a barium compound from which barium oxide is available at the temperature of the molten charge.

2. In the art of treating ferrous metals, the process comprising, melting the metal in an acidic chamber, removing slag from the molten charge at a temperature of about 2700° F., adding an oxybarium compound to the molten charge, and thereafter further elevating the temperature of the charge.

3. In the art of treating ferrous metals, the process comprising, melting the metal in an acidic chamber, removing slag from the molten charge, and adding barium carbonate to the molten charge in the acidic chamber.

4. In the art of treating ferrous metals, the process comprising, melting the metal in an acidic chamber, removing slag from the molten charge at a temperature of about 2700° F., adding barium carbonate to the molten charge, and thereafter further elevating the temperature of the charge.

5. In the art of treating ferrous metals, the process comprising, melting the metal in an acidic chamber, removing slag from the molten charge, and adding a mixture of barium carbonate and barium oxide to the charge in the acidic chamber.

6. In the art of treating ferrous metals at temperatures 2800° F. and upward under acidic conditions, the process comprising, adding a barium compound containing available barium oxide at the temperature of treatment to the molten charge in an acidic chamber.

7. In the electric furnace treatment of ferrous metals, the process comprising, melting the metal in an acid lined electric furnace, removing the slag before the maximum temperature is reached, and adding barium carbonate to the charge in the furnace.

8. The method of controlling acid lined electric furnace charges of ferrous metal, which comprises, adding barium carbonate to the charge in the furnace after the slag is removed and before the maximum temperature is reached.

9. In the art of treating ferrous metals at temperatures of 2700° F. and upward under acid conditions, the process comprising, melting the ferrous metal, and treating the molten charge in an acidic chamber by the addition of barium carbonate.

CHAMBERS R. CULLING.
MALVIN A. BAERNSTEIN.